Jan. 23, 1945.  J. C. GILBERT-CARTER  2,367,938
MOTOR CONTROL SYSTEM
Filed Jan. 9, 1943
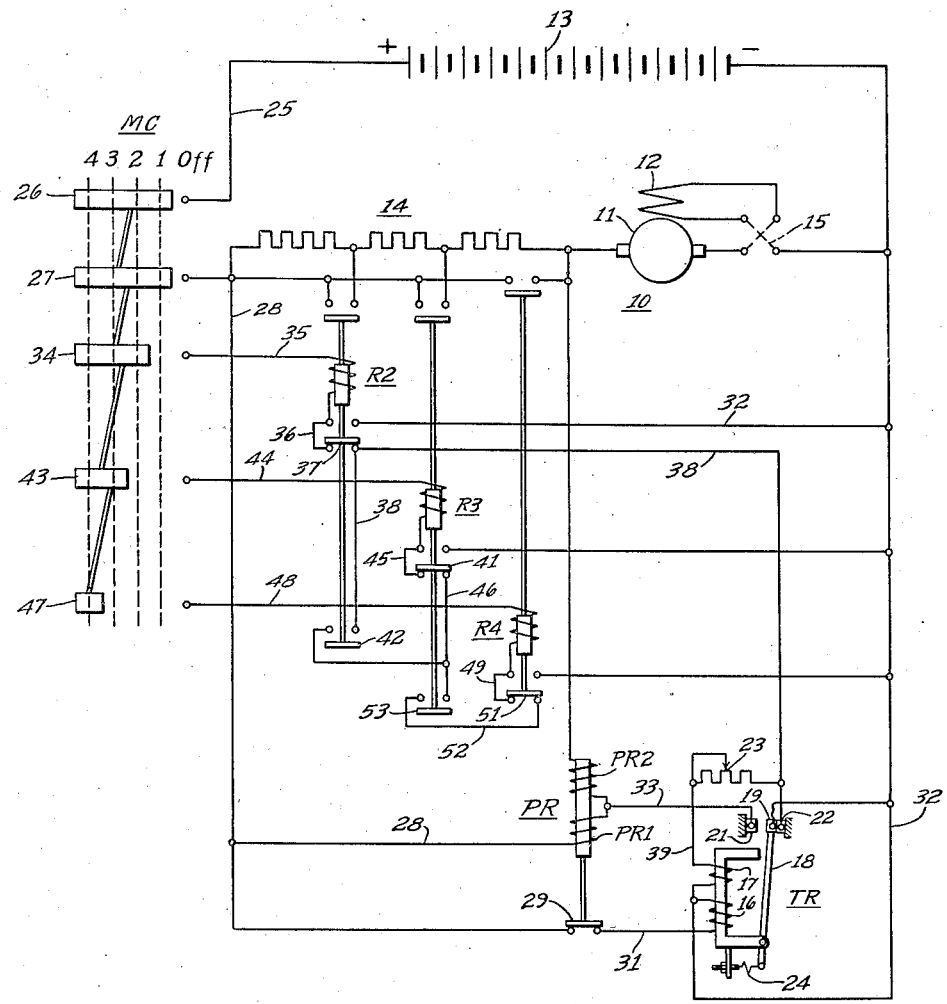
WITNESSES:
INVENTOR
John C. Gilbert-Carter.
BY
ATTORNEY Patented Jan. 23, 1945

2,367,938

UNITED STATES PATENT OFFICE 2,367,938

MOTOR CONTROL SYSTEM

John C. Gilbert-Carter, Irwin, Pa., assignor to Westinghouse Electric & Manufacturing Company, East Pittsburgh, Pa., a corporation of Pennsylvania Application January 9, 1943, Serial No. 471,817

10 Claims. (Cl. 172—179)

My invention relates, generally, to control systems and, more particularly, to systems for controlling the starting of electric motors.

An object of my invention, generally stated, is to provide a motor starting system which shall be simple and efficient in operation and which may be economically manufactured and installed.

A more specific object of my invention is to provide an adjustable time interval between the operation of each switch and the next succeeding switch of a plurality of sequentially operated resistor-shunting switches.

Another object of my invention is to utilize a single timing relay for controlling the operation of a plurality of resistor-shunting switches.

A further object of my invention is to provide for opening any desired number of resistor-shunting switches during their sequential operation and then reclosing them under the control of a timing relay.

Still another object of my invention is to prevent the operation of the resistor-shunting switches for starting a motor while the motor is rotating in a direction opposite to that for which the reversing controller is set.

Other objects of my invention will be explained fully hereinafter or will be apparent to those skilled in the art.

In accordance with my invention the time interval between the operation of each switch and the next succeeding switch of a plurality of sequentially operated resistor-shunting switches for starting a motor is controlled by a timing relay which may be adjusted to operate within predetermined limits. An additional relay cooperates with the timing relay to prevent the operation of the switches if the motor is rotating in a direction opposite to that for which the reversing controller is set.

For a fuller understanding of the nature and objects of the invention, reference may be had to the following detailed description, taken in conjunction with the accompanying drawing, in which the single figure is a diagrammatic view of a control system embodying the invention.

Referring to the drawing, the system shown therein comprises a motor 10 having an armature winding 11 and a series field winding 12, a battery 13 for supplying power for operating the motor 10, a controller MC for connecting the motor 10 to the battery 13, a resistor 14 for limiting the motor current during starting of the motor, a plurality of resistor-shunting switches R2, R3 and R4 which are operable in sequential relation to shunt the resistor 14 from the motor circuit in a step-by-step manner and the usual reversing switch 15 for controlling the direction of operation of the motor 10.

In order to simplify the drawing and description, only three resistor shunting switches have been shown. It will be understood that additional switches and additional steps of resistance may be utilized if desired. It will also be understood that the motor may be operated from any other suitable source of power instead of the battery 13.

During starting of electric motors of the type herein shown it is customary to bring the motor up to speed by shunting the starting resistor from the motor circuit either by means of a manually operable controller or by means of electrically operated switches which are controlled by the manually operable controller. Various systems have been devised for automatically controlling the operation of the resistor-shunting switches either by means of a current responsive relay or by means of an individual timing relay for each switch, thereby securing a definite time interval between the operation of the switches.

In order to secure a definite time interval between the operation of each switch and the next succeeding switch in the present system, a single timing relay TR and a cooperating relay which will be known as a non-plugging relay PR are utilized to control the timing of all the resistor-shunting switches. As will be explained more fully hereinafter, the non-plugging relay PR also functions to prevent the sequential operation of the resistor-shunting switches in the event the motor is rotating in a direction opposite to that for which the reversing controller 15 is set.

As shown, the timing relay TR is provided with a main or actuating coil 16 and a neutralizing coil 17. The design of the relay is such that its armature 18 is actuated to close contact members 19 and 21 when the coil 16 is energized. When the coil 16 is deenergized and the neutralizing coil 17 is energized, the armature is actuated to a position to close contact members 19 and 22. The time required for the relay to open its contact members 19 and 21 may be controlled by the amount of current permitted to flow through the neutralizing coil 17. Thus the time may be adjusted by means of a rheostat 23 which is connected in the circuit for the neutralizing coil 17. With no current in the neutralizing coil 17 the contact members 19 and 21 of the relay will remain closed indefinitely. The timing of the relay may also be adjusted by means of a spring 24 which is disposed to bias the armature 18 to the position in which the contact members 19 and 22 are closed.

The relay PR is also provided with two coils PR1 and PR2. The coil PR1 is the main or actuating coil of the relay and the function of the coil PR2 will be explained more fully hereinafter.

In order that the functioning of the foregoing apparatus may be more clearly understood, the operation of the system will now be described in more detail. Assuming that it is desired to accelerate the motor at the maximum rate permitted by the timing relay, the controller MC is actuated to position 4, thereby connecting the motor 10 across the battery 13 in series-circuit relation with all of the resistor 14.

At this time a circuit is also established for the actuating coil 16 of the relay TR. This circuit may be traced from the positive terminal of the battery 13 through conductor 25, the contact segments 26 and 27 of the controller MC, conductor 28, contact members 29 of the relay PR, conductor 31, the actuating coil 16 and the conductor 32 to the negative terminal of the battery 13.

When the contact members 19 and 21 of the timing relay TR are closed a circuit is established for the actuating coil PR1 of the relay PR. This circuit extends from the conductor 28, through the coil PR1, conductor 33, contact members 19 and 21 and the negative conductor 32 to the battery 13. The energization of the coil PR1 operates the relay PR to open its contact members 29, thereby deenergizing the main coil 16 of the relay TR.

At this time the neutralizing coil 17 of the relay TR is energized through a circuit which may be traced from the contact segment 34 of the controller MC, conductor 35, the actuating coil of the switch R2, conductor 36, an interlock 37 on the switch R2, conductor 38, the rheostat 23, conductor 39, the neutralizing coil 17 and the conductor 32 to the negative terminal of the battery 13. Accordingly, the neutralizing coil deenergizes the relay TR and the armature 18 is actuated to its deenergized position after a certain time interval, depending upon the amount of current that may flow through the neutralizing coil 17 and the tension of the spring 24, as explained hereinbefore.

As soon as the relay TR is deenergized, the energizing circuit for the coil PR1 of relay PR is interrupted by the opening of the contact members 19 and 21 of the relay TR. Accordingly, the relay PR is deenergized and the energizing circuit for the coil 16 of the relay TR is reestablished through the contact members 29 of the relay PR. In this manner the relay TR is reclosed and, in the absence of any other control feature, the cycle of operation of the relays TR and PR would continue indefinitely.

However, it will be noticed that once in each cycle the TR relay is open for a short time and the contact members 19 and 22 of the relay are closed. The closing of the contact members 19 and 22 connects the conductor 38 directly to the negative terminal of the battery 13 through the conductor 32. The conductor 38 is connected to the actuating coils for the resistor-shunting switches R2, R3 and R4, one at a time through interlocking members carried by the resistor-shunting switches. In this manner the actuating coils of the resistor-shunting switches are successively energized under the control of the timing relay TR.

After each switch has closed, the energizing circuit for its actuating coil is transferred by interlocks from the conductor 38 to the negative conductor 32. At the same time a circuit is set up for the energization of the actuating coil of the next succeeding switch, which is energized as soon as the timing relay TR and the relay PR have completed another cycle of operation.

For example, when the switch R2 is closed by the energization of its actuating coil through a circuit which extends from the controller segment 34 through conductor 35, the coil of the switch R2, conductor 36, the interlock 37, conductor 38 and the contact members 19 and 22 of the relay TR to the negative conductor 32, the interlock 37 carried by the switch R2 is actuated from the position shown in the drawing to a position in which the actuating coil of the switch R2 is connected directly to the negative conductor 32.

Also, the actuating coil of the switch R3 is connected through an interlock 41 carried by the switch R3, and an interlock 42 carried by the switch R2 to the conductor 38. However, the switch R3 will not be actuated at this time since the relay TR will have been reenergized and the cycle of operation of the relay TR and PR must be repeated before the switch R3 can close. When the timing cycle is completed the actuating coil of the switch R3 is energized through a circuit which may be traced from a segment 43 of the controller MC, conductor 44, the coil of the switch R3, conductor 45, the interlock 41, conductor 46, the interlock 42 on the switch R2, the conductor 38 and the contact members 19 and 22 of the relay TR to the negative conductor 32.

Following the closing of the switch R3, the switch R4 is closed in a similar manner after the completion of another timing cycle. The energizing circuit for the actuating coil of the switch R4 may be traced from a segment 47 of the controller MC, conductor 48, the coil of the switch R4, conductor 49, interlock 51, conductor 52, interlock 53 of the switch R3, conductor 46, the interlock 42 of the switch R2, conductor 38 and the contact members 19 and 22 of the relay TR to the negative conductor 32. In this manner as many of the resistor-shunting resistances as have a positive supply to their actuating coils from the controller MC will close in the desired sequence with a definite time interval between the operation of each switch and the next succeeding switch.

In order to stop the operation of the timing relay after the desired number of switches have been closed, the neutralizing coil 17 of the relay TR is connected between the conductor 38 and the negative conductor 32 in series-circuit relation with the rheostat 23. Thus, the neutralizing coil is also in series-circuit relation with each of the actuating coils for the resistor-shunting switches during the time that the contact members 19 and 22 of the relay TR are open. If there is a positive supply on the actuating coil of the next succeeding switch, as will be the case if the equipment has not yet advanced to the controller position, then a circuit is established from the controller segment as, for example, the segment 43 through the actuating coil of the switch R3 and the interlocks 41 and 42 to the conductor 38, thence through the rheostat 23 and the neutralizing coil 17 to the negative conductor 32. However, since the actuating coil of the resistor-shunting switch is so designed that it will not operate the switch when connected in series-circuit relation with the rheostat 23 and the neutralizing coil 17, the switch R3 is not operated this time. After the predetermined time interval the neutralizing coil 17 causes the relay TR to close its contact members 19 and 22 to connect the actuating coil of the switch R3 directly to the negative conductor, thereby operating the switch R3.

However, if the controller MC has not been advanced to connect the segment 43 to the conductor 44 there will be no positive supply on the conductor 38. Hence, there will be no current in the neutralizing coil and the contact members 19 and 21 of the relay TR will remain closed indefinitely, preventing the closing of any additional resistor-shunting switches and stopping the cycle of operation of the relays TR and PR. In this manner as many resistor-shunting switches as desired may be closed by advancing the controller MC to the desired position.

If the controller MC is returned toward the "off" position it will cause a certain number of the resistor-shunting switches to be opened, depending upon the position to which the controller is returned. When the controller is again advanced the switches are reclosed under the control of the timing relay in the manner hereinbefore described.

As explained hereinbefore, the relay PR is provided with a second coil PR2 which is connected across the motor 10 through the contact members 19 and 21 of the relay TR. Accordingly, the coil PR2 is energized by the counter-electromotive force of the motor. The coil PR2 is so disposed on the relay PR that if the motor is rotating in the desired direction the voltage on the coil PR2 assists the coil PR1 to operate the relay. However, if the motor is rotating in the opposite direction to that for which the reverser is set and power is applied to "plug" the motor, the counter-electromotive force of the motor will be in such a direction that the voltage on the coil PR2 will oppose the coil PR1, thereby preventing operation of the relay PR to open its contact members 29. Accordingly, the cycle of operation of the relays TR and PR hereinbefore described cannot take place and the operation of the resistor-shunting switches is prevented. Therefore, the motor current is limited by the full amount of the series resistance 14 which is connected in the motor circuit.

From the foregoing description it is apparent that I have provided a system for controlling the starting of electric motors which is simple in construction and flexible in operation. Thus, the advancement of the control apparatus may be stopped at any time during the starting operation and then continued without it being necessary to return the master controller completely to the "off" position to disconnect the motor from the power source.

As explained hereinbefore, the system requires a relatively small amount of apparatus since only a single timing relay is utilized for controlling the operation of all the resistor-shunting switches. Furthermore, the present system prevents the operation of the resistor-shunting switches during "plugging" of the motor, thereby limiting the current drawn by the motor.

Since many modifications may be made in the apparatus and arrangement of parts without departing from the spirit of my invention, I do not wish to be limited other than by the scope of the appended claims.

I claim as my invention:

1. In a motor control system, in combination, a motor, a resistor for controlling the motor current, a plurality of switches operable in sequential relation to shunt the resistor from the motor circuit, interlocking means on said switches for controlling their sequence of operation, and a pair of relays cooperating to control the time interval between the operation of each switch and the next succeeding switch, one of said relays being responsive to the counter-electromotive force of the motors.

2. In a motor control system, in combination, a motor, a resistor for controlling the motor current, a plurality of switches operable in sequential relation to shunt the resistor from the motor circuit, interlocking means on said switches for controlling their sequence of operation, a pair of relays cooperating to control the time interval between the operation of each switch and the next succeeding switch, and adjustable means on one of said relays for varying the time interval between switch operations.

3. In a motor control system, in combination, a motor, a resistor for controlling the motor current, a plurality of switches operable in sequential relation to shunt the resistor from the motor circuit, interlocking means on said switches for controlling their sequence of operation, and a pair of relays cooperating to control the time interval between the operation of each switch and the next succeeding switch.

4. In a motor control system, in combination, a motor, a resistor for controlling the motor current, a plurality of switches operable in sequential relation to shunt the resistor from the motor circuit, interlocking means on said switches for controlling their sequence of operation, and a pair of relays cooperating to control the time interval between the operation of each switch and the next succeeding switch, one of said relays having a coil thereon responsive to the counter-electromotive force of the motor.

5. In a motor control system, in combination, a motor, a resistor for controlling the motor current, a plurality of switches operable in sequential relation to shunt the resistor from the motor circuit, interlocking means on said switches for controlling their sequence of operation, and a pair of relays cooperating to control the time interval between the operation of each switch and the next succeeding switch, one of said relays having a coil thereon responsive to the counter-electromotive force of the motor, and adjustable means on the other of said relays for varying the time interval between switch operations.

6. In a motor control system, in combination, a motor, a controller for controlling the energization of the motor, a resistor for controlling the motor current, a plurality of switches operable in sequential relation to shunt the resistor from the motor circuit, interlocking means on said switches cooperating with said controller to control the sequence of operation of the switches, and a pair of relays cooperating to control the time interval between the operation of each switch and the next succeeding switch.

7. In a motor control system, in combination, a motor, a controller for controlling the energization of the motor said controller being operable to a plurality of different positions, a resistor for controlling the motor current, a plurality of switches operable in sequential relation to shunt the resistor from the motor circuit, means on said controller for controlling the operation of said switches in accordance with the position of the controller, interlocking means on said switches cooperating with said controller to control the sequence of operation of the switches, and a timing relay for controlling the time interval between the operation of each switch and the next succeeding switch, said timing relay cooperating with said controller and said interlocking means to stop the sequential operation of said switches on predetermined positions of the controller.

8. In a motor control system, in combination, a motor, a controller for controlling the energization of the motor, said controller being operable to a plurality of different positions, a resistor for controlling the motor current, a plurality of switches operable in sequential relation to shunt the resistor from the motor circuit, means on said controller for controlling the operation of said switches in accordance with the position of the controller, interlocking means on said switches cooperating with said controller to control the sequence of operation of the switches, and a pair of relays cooperating to control the time interval between the operation of each switch and the next succeeding switch, said relays cooperating with said controller and said interlocking means to stop the sequential operation of said switches on predetermined positions of the controller.

9. In a motor control system, in combination, a motor, a controller for controlling the energization of the motor, said controller being operable to a plurality of different positions, a resistor for controlling the motor current, a plurality of switches operable in sequential relation to shunt the resistor from the motor circuit, means on said controller for controlling the operation of said switches in accordance with the position of the controller, interlocking means on said switches cooperating with said controller to control the sequence of operation of the switches, and a timing relay for controlling the time interval between the operation of each switch and the next succeeding switch, said timing relay cooperating with said controller to cause certain of said switches to be opened and then reclosed without deenergizing said motor.

10. In a motor control system, in combination, a motor, a controller for controlling the energization of the motor, said controller being operable to a plurality of different positions, a resistor for controlling the motor current, a plurality of switches operable in sequential relation to shunt the resistor from the motor circuit, means on said controller for controlling the operation of said switches in accordance with the position of the controller, interlocking means on said switches cooperating with said controller to control the sequence of operation of the switches, and a pair of relays cooperating to control the time interval between the operation of each switch and the next succeeding switch, said relays cooperating with said controller to cause certain of said switches to be opened and then reclosed without deenergizing said motor.

JOHN C. GILBERT-CARTER.